United States Patent
Meyer et al.

(10) Patent No.: US 12,306,201 B2
(45) Date of Patent: May 20, 2025

(54) LABORATORY SYSTEM TO MONITOR REFERENCE POINTS OF LABORATORY DEVICES

(71) Applicant: Roche Diagnostics Operations, Inc., Indianapolis, IN (US)

(72) Inventors: Thomas Meyer, Walchwil (CH); Anthony Sibler, Villmergen (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 862 days.

(21) Appl. No.: 17/454,275

(22) Filed: Nov. 10, 2021

(65) Prior Publication Data

US 2022/0196690 A1 Jun. 23, 2022

(30) Foreign Application Priority Data

Dec. 22, 2020 (EP) ..................................... 20216382

(51) Int. Cl.
*G01N 35/04* (2006.01)

(52) U.S. Cl.
CPC ........ *G01N 35/04* (2013.01); *B01L 2200/025* (2013.01); *G01N 2035/0406* (2013.01); *G01N 2035/0496* (2013.01)

(58) Field of Classification Search
CPC ........... G01N 35/04; G01N 2035/0406; G01N 2035/0496; G01N 35/0099;

(Continued)

(56) References Cited

U.S. PATENT DOCUMENTS 4,206,840 A 6/1980 Hanson
9,182,419 B2 11/2015 Hecht
(Continued)

FOREIGN PATENT DOCUMENTS

EP 2148204 B1 1/2010
EP 2988134 A1 2/2016
(Continued)

OTHER PUBLICATIONS

European Search Report issued Jun. 7, 2021, in Application No. 20216382.0, 2 pp.

*Primary Examiner* — John McGuirk
(74) *Attorney, Agent, or Firm* — Woodard, Emhardt, Henry, Reeves & Wagner, LLP

(57) ABSTRACT

The present disclosure relates to a laboratory system to monitor reference points of laboratory devices. The laboratory system comprises a first laboratory device comprising a first reference point, a second laboratory device comprising a second reference point, and a coupling element. The coupling element couples the first reference point and the second reference point. The coupling element comprises a detectable part adapted to be moved between a starting position and at least one detection position when the relative position of the first reference point and the second reference point to each other changes. The laboratory system further comprises a sensor configured to detect the detectable part of the coupling element in the at least one detection position. In addition, a method of operating the laboratory system as described is disclosed.

13 Claims, 5 Drawing Sheets

(58) Field of Classification Search
CPC ....... G01N 35/00732; B01L 9/00; B01L 9/50; B01L 2200/02; B01L 2200/025
See application file for complete search history.

(56) References Cited

U.S. PATENT DOCUMENTS

| | | | |
|---|---|---|---|
| 2010/0219968 A1* | 9/2010 | Teutenberg | F16P 3/142 340/686.6 |
| 2012/0186200 A1 | 7/2012 | Jones et al. | |
| 2015/0069893 A1* | 3/2015 | Bernet | B60B 33/0002 414/800 |
| 2017/0176481 A1 | 6/2017 | Accurso et al. | |
| 2020/0408788 A1* | 12/2020 | Lapczyna | G01N 35/0099 |

FOREIGN PATENT DOCUMENTS

| | | |
|---|---|---|
| EP | 2566787 B1 | 3/2016 |
| EP | 2848944 B1 | 8/2018 |
| EP | 3070479 B1 | 7/2019 |

* cited by examiner

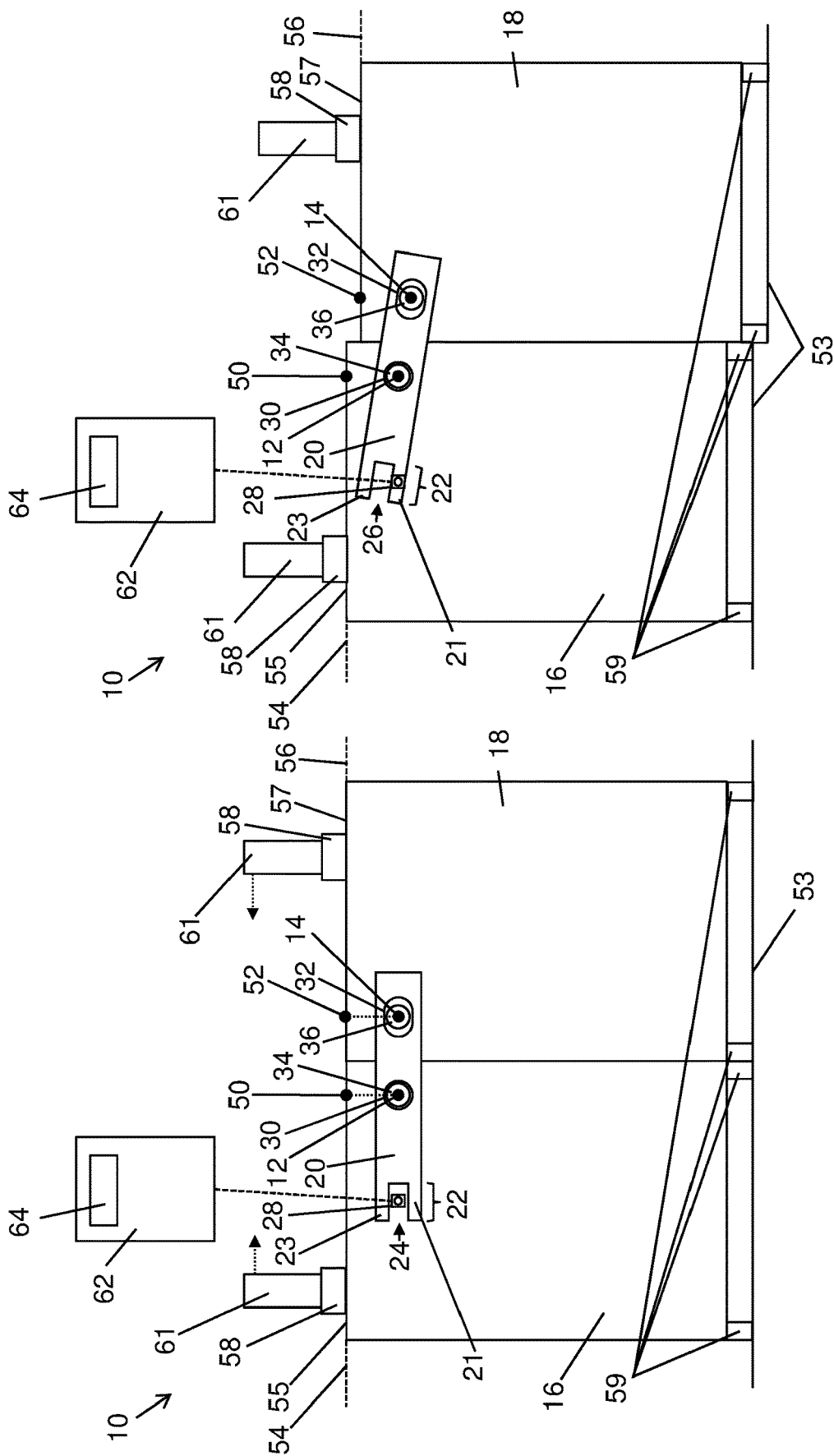

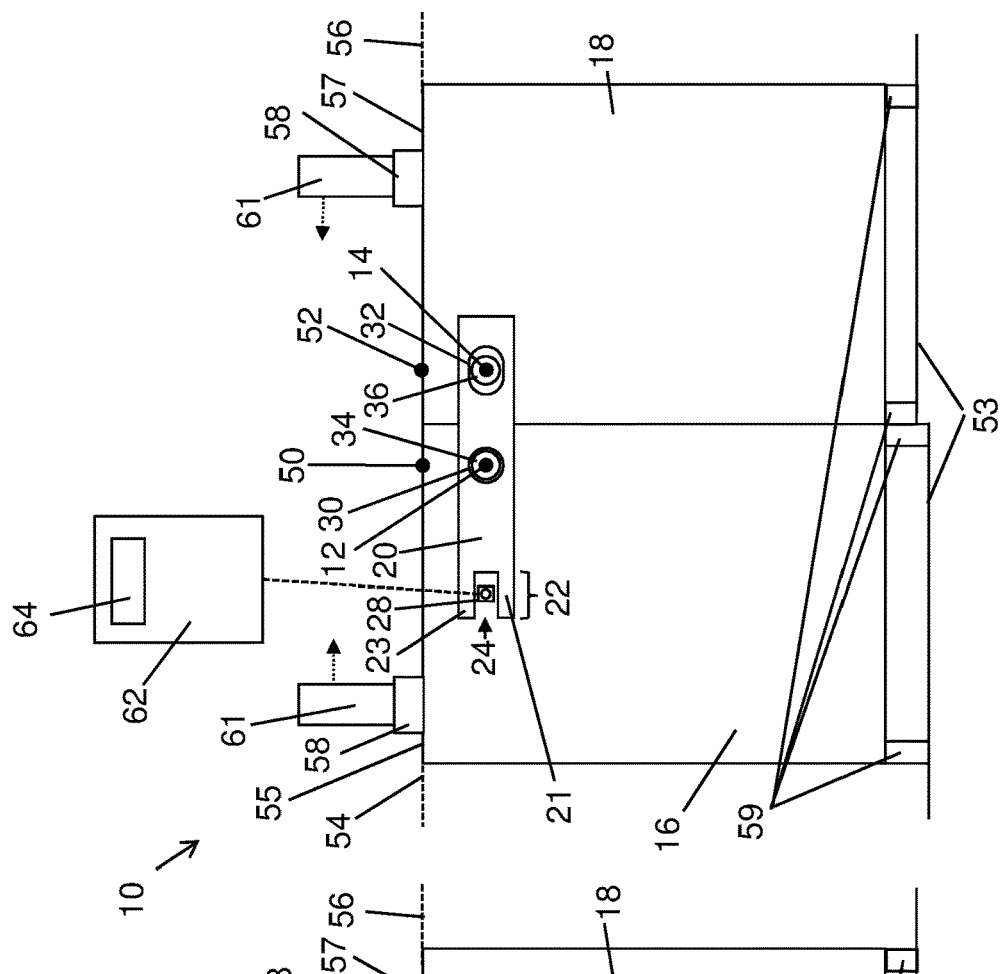
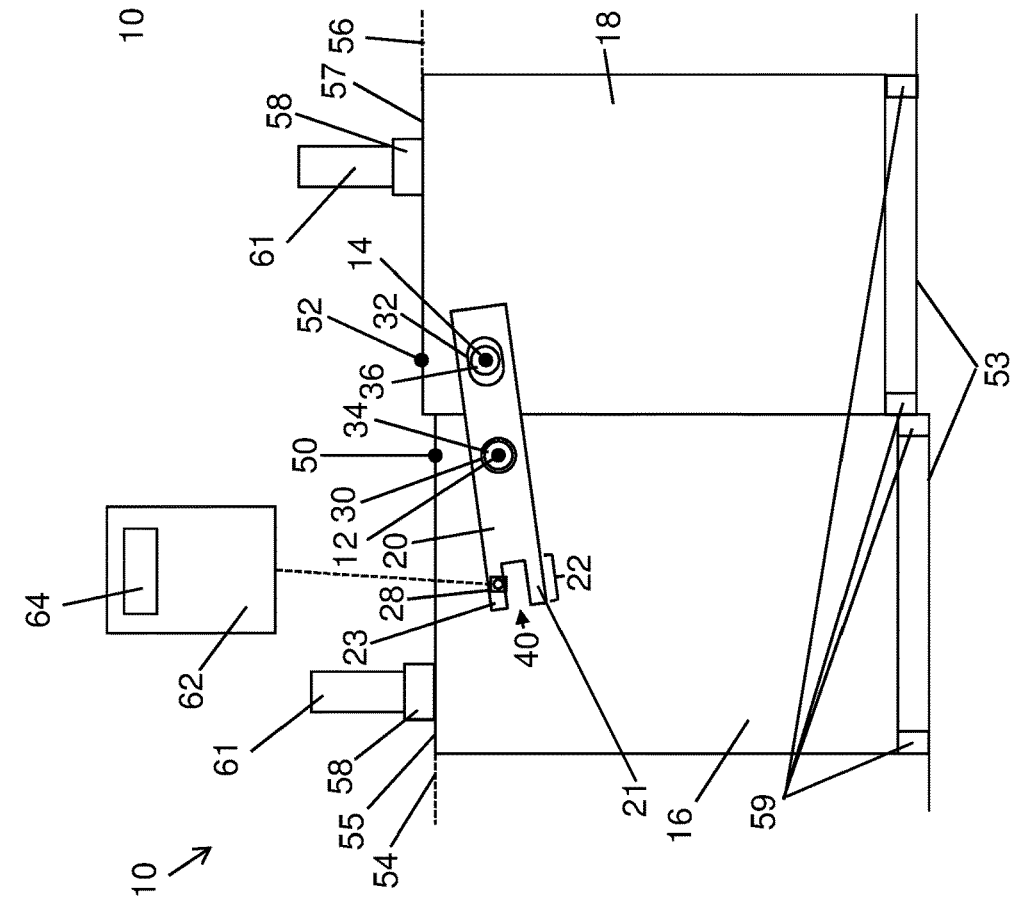
FIG. 1D
FIG. 1C

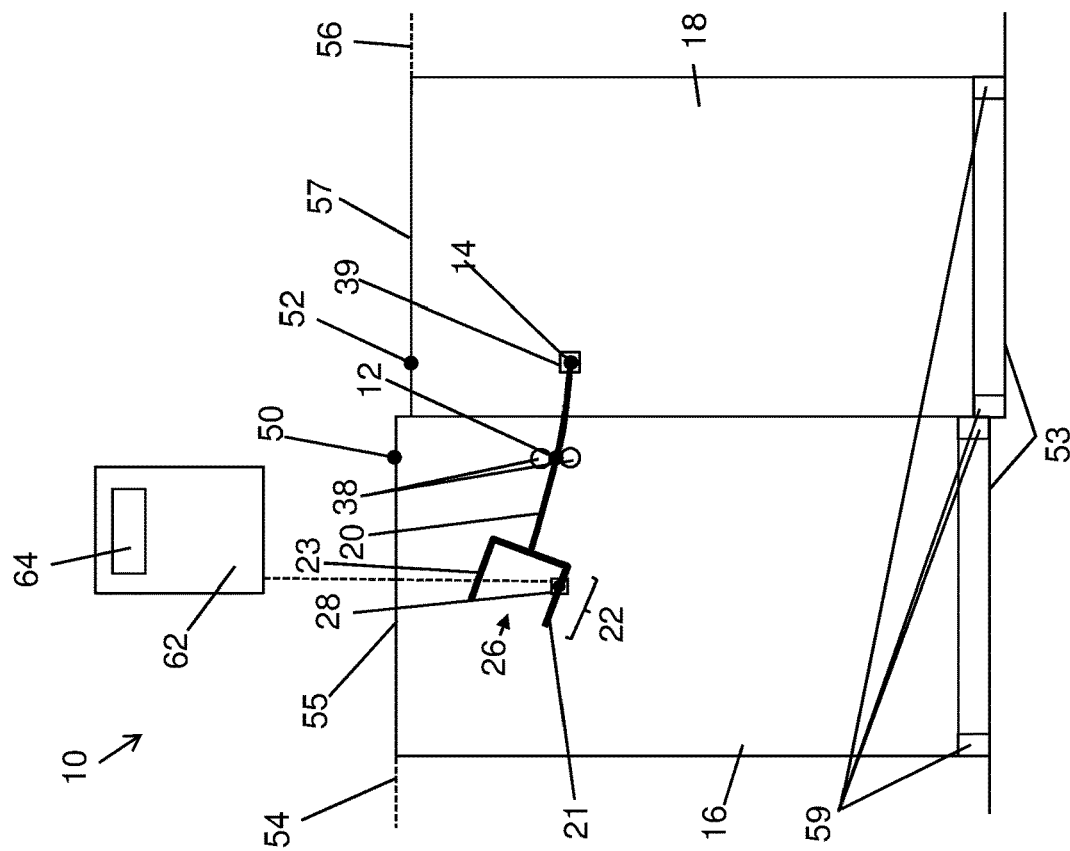
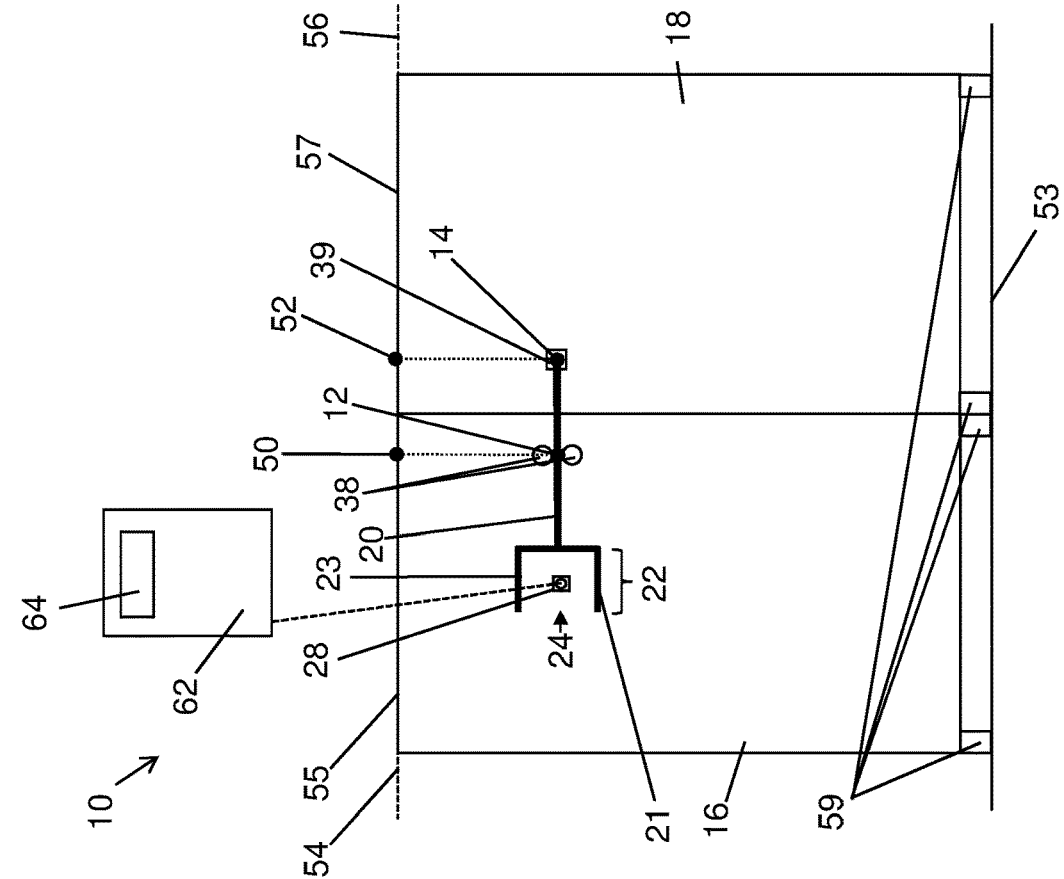
FIG. 2B
FIG. 2A

LABORATORY SYSTEM TO MONITOR REFERENCE POINTS OF LABORATORY DEVICES

CROSS-REFERENCE TO RELATED APPLICATIONS

This application claims priority to European Patent Application No. 20216382.0, filed 22 Dec. 2020, the disclosure of which is hereby incorporated by reference in its entirety.

TECHNICAL FIELD

The present disclosure belongs to the field of automated in vitro diagnostic laboratory testing. Within this field, it relates to a laboratory system to monitor reference points of laboratory devices and a method of operating the laboratory system.

BACKGROUND

In diagnostic laboratory environments, laboratory containers such as test liquid vessels are transported or transferred between multiple laboratory devices according to predefined laboratory workflows in order to produce accurate and reliable test results, which represent pivotal information for physicians. Typically, laboratory containers are transported in laboratory carriers that can receive either one or multiple laboratory containers. In fully automated laboratories, such laboratory carriers are transported on one or more planar transportation surfaces of one or more transportation devices in order to distribute the laboratory containers to and/or within operatively coupled pre-analytical, analytical, and post-analytical instruments that can conduct different processing steps like preparing, analysing, or archiving of test liquids. One or more transportation devices may form a laboratory transport system as, for example, disclosed in EP 2 566 787 B1.

For a secure and reliable handover or transfer of laboratory containers or laboratory carriers between laboratory devices, the laboratory devices should be accurately positioned to each other. Usually, such laboratory devices are properly aligned and levelled to each other when they are installed in a diagnostic laboratory environment using adjusting means such as, for example, adjustable feet as disclosed in EP 2 848 944 B1. However, after installation, the relative position between laboratory devices may change over time and a secure and reliable transfer of laboratory containers between laboratory devices is not assured any longer. Such changes may occur slowly over a long period of time, e.g., due to a non-uniform movement of the laboratory floor on which the laboratory devices are installed. Furthermore, small changes in the relative position between laboratory devices are difficult to detect and can significantly disrupt the transfer of laboratory containers between laboratory devices so that laboratory containers are damaged and the leaked test liquid contaminates the laboratory devices.

Therefore, there is a need for detecting changes of the relative position between operatively coupled laboratory devices in a simple and reliable way, thereby better serving the needs of automated in vitro diagnostic laboratory testing.

SUMMARY

A laboratory system to monitor reference points of laboratory devices and a method of operating the laboratory system are disclosed herein.

In accordance with one embodiment of the present disclosure, a laboratory system to monitor reference points of laboratory devices is provided, wherein the laboratory system comprises: a first laboratory device comprising a first reference point; a second laboratory device comprising a second reference point; a coupling element wherein the coupling element couples the first reference point and the second reference point, wherein the coupling element comprises a detectable part adapted to be moved between a starting position and at least one detection position when the relative position of the first reference point and the second reference point to each other changes, wherein the first reference point comprises a pivot point, wherein the coupling element is pivotable fixed to the pivot point so that the detectable part is movable between the starting position and the at least one detection position; and a sensor configured to detect the detectable part of the coupling element in the at least one detection position, wherein the coupling element is a lever comprising a first recess and a second recess, wherein the pivot point comprises a first pin engaging pivotable with the first recess, wherein the second reference point comprises a second pin engaging movably with the second recess.

In accordance with another embodiment of the present disclosure, a laboratory system to monitor reference points of laboratory devices is provided, wherein the laboratory system comprises: a first laboratory device comprising a first reference point; a second laboratory device comprising a second reference point; a coupling element wherein the coupling element couples the first reference point and the second reference point, wherein the coupling element comprises a detectable part adapted to be moved between a starting position and at least one detection position when the relative position of the first reference point and the second reference point to each other changes; and a sensor configured to detect the detectable part of the coupling element in the at least one detection position, wherein the first reference point and a portion of the coupling element are located between two stopping elements so that the coupling element hits one of the two stopping elements when the relative position of the first reference point and the second reference point to each other changes, wherein the second reference point comprises a support element on which the coupling element is mounted, wherein the coupling element is bendable.

In accordance with yet another embodiment of the present disclosure, a method of operating a laboratory system according to an embodiment of the present disclosure is provided, the method comprising the following steps: detecting, by the sensor, the detectable part of the coupling element in the at least one detection position; and triggering, by the control unit, a maintenance action.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which:

FIGS. 1A-1D show a schematic side view of an embodiment of a laboratory system to monitor reference points of laboratory devices in accordance with an embodiment of the present disclosure;

FIGS. 2A-2B show another schematic side view of an embodiment of a laboratory system to monitor reference points of laboratory devices in accordance with an embodiment of the present disclosure;

Figure 3:
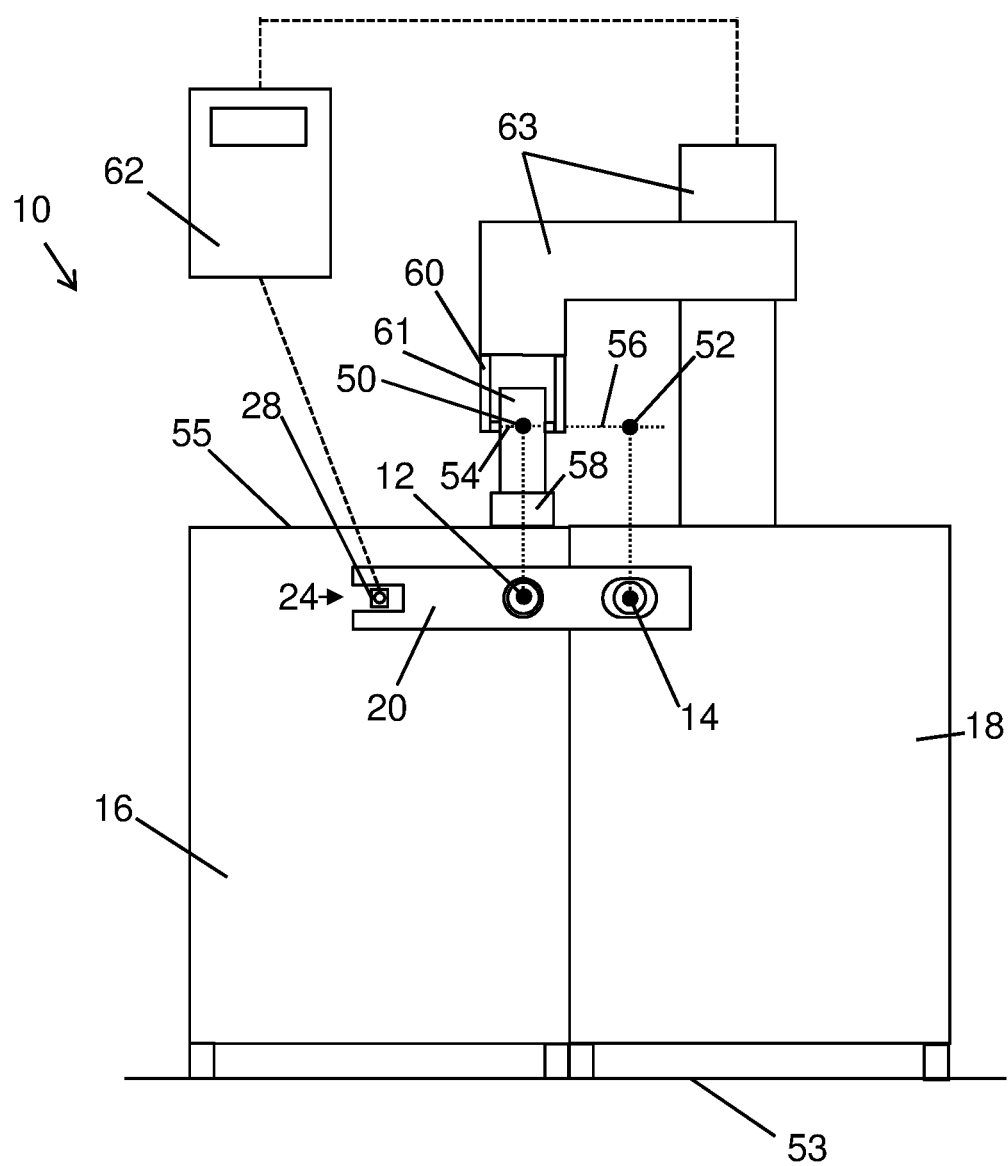
FIG. 3 shows a schematic side view of another embodiment of a laboratory system to monitor reference points of laboratory devices in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The present disclosure relates to a laboratory system to monitor reference points of laboratory devices. The laboratory system comprises a first laboratory device comprising a first reference point, a second laboratory device comprising a second reference point, and a coupling element. The coupling element couples the first reference point and the second reference point. The coupling element comprises a detectable part adapted to be moved between a starting position and at least one detection position when the relative position of the first reference point and the second reference point to each other changes. The laboratory system further comprises a sensor configured to detect the detectable part of the coupling element in the at least one detection position.

The present disclosure also relates to a method of operating a laboratory system as described herein. The method comprises the following steps: detecting, by the sensor, the detectable part of the coupling element in the at least one detection position; and triggering, by the control unit, a maintenance action.

As used herein, the term "laboratory system" relates to a system designed to process a laboratory container or a test liquid in a laboratory container using laboratory devices. The laboratory system may comprise two or more laboratory devices operatively coupled to each other. The laboratory device may be a transportation device, pre-analytical instrument, analytical instrument, or post-analytical instrument.

As used herein, the term "transportation device" relates to a device being designed to transport laboratory containers to and/or within pre-analytical, analytical, or post-analytical instruments. The transportation device may comprise a plane comprising a planar transportation surface adapted to transport a laboratory container or a laboratory carrier loaded with a laboratory container. The planar transportation surface may comprise a conveyor belt to move a laboratory container or a laboratory carrier loaded with a laboratory container. Alternatively, the transportation device may comprise a stable planar transportation surface on which self-propelled laboratory carriers can move. Alternatively, the transportation device may comprise a number of electromagnetic actuators being stationary arranged below the planar transportation surface and adapted to generate magnetic fields to move a laboratory carrier. The transportation device may be designed as described in EP 2 566 787 B1, reference number 51 in FIG. 1 and corresponding description. Multiple transportation devices may form a laboratory transport system. Such a laboratory transport system device may be designed as described in EP 2 566 787, reference number 100 and corresponding description.

As used herein, the term "laboratory container" relates to a device configured for receiving, holding, transporting, and/or releasing a test liquid. The laboratory container may be, as non-limiting examples, a test liquid vessel or test liquid tube. In one embodiment, the test liquid is a biological liquid, a test reagent, or a mixture of a biological liquid and test reagent. As used herein, the term "biological liquid" relates to a patient's specimen (e.g., serum, plasma, whole blood, urine, sputum, cerebrospinal fluid, bone marrow, etc.) from which the presence and if desired the concentration of an analyte or analyte related parameter can be determined using a test reagent. Typically, a test reagent comprises a substance or solution that reacts with a certain analyte or analyte-related substance in the biological liquid in order to generate a measurable signal indicative of the presence and/or concentration of the analyte in the biological liquid.

As used herein, the term "laboratory carrier" relates to a device configured for receiving, holding, transporting, and/or releasing one or more laboratory containers. The laboratory carrier may be, as non-limiting examples, a laboratory container holder or a laboratory container rack. In an embodiment, the laboratory carrier comprises at least one magnetically active device that interacts with a magnetic field so that a magnetic force is applied to the laboratory carrier. A laboratory carrier comprising at least one magnetically active device that interacts with a magnetic field is well known in the art and may be designed as described in EP 2 988 134 A1, reference number 10 and corresponding description, or as described in EP 3 070 479 A1, reference number 1 and corresponding description. In another embodiment, the laboratory carrier comprises motor-driven wheels. A laboratory carrier comprising motor-driven wheels is well known in the art and may be designed as described in U.S. Pat. No. 9,182,419 B2. In another embodiment, the laboratory carrier is configured to be transported on a planar transportation surface comprising one or more conveyor belts to move and stop the laboratory carrier on the planar transportation surface.

A pre-analytical instrument can usually be used for the preliminary processing steps of laboratory containers and/or test liquids. Preliminary processing steps are, as non-limiting examples, test liquid centrifugation, analyte isolation from a test liquid, test liquid resuspension (e.g., by mixing or vortexing), laboratory container capping, laboratory container decapping, laboratory container recapping, laboratory container sorting, laboratory container type identification, test liquid quality determination, and/or aliquoting steps.

An analytical instrument can be designed, for example, to use a test liquid or part of the test liquid in order to produce a measurable signal, on the basis of which it is possible to determine whether an analyte is present in the test liquid, and if desired in what concentration. Analytical instruments are, as non-limiting examples, clinical chemistry analyzers, coagulation chemistry analyzers, immune chemistry analyzers, urine analyzers, and/or nucleic acid analyzers.

A post-analytical instrument can usually be used for the post-processing of laboratory containers and/or test liquids like the archiving of laboratory containers. A post-analytical instrument for archiving (storing and retrieving) laboratory containers is well known in the art and may be designed as described in EP 2 148 204 B1, reference number 10 in FIG. 1, and corresponding description.

The pre-analytical instrument, analytical instrument, and post-analytical instrument may comprise, for example, at least one processing device from the group of following processing devices: a gripper for gripping and sorting a laboratory container, a transportation device for transporting or transferring a laboratory container or laboratory carrier, a cap removal device for removing a cap or closure on a laboratory container, a cap fitting device for fitting a cap or a closure on a laboratory container, a cap removal/fitting device for removing/fitting a cap or a closure on a laboratory container, a pipetting device for pipetting a test liquid, an aliquoting device for aliquoting a test liquid, a centrifuging device for centrifuging a test liquid, an analyzing device for analyzing a test liquid, a heating device for heating a test liquid, a cooling device for cooling a test liquid, a mixing device for mixing a test liquid, a separation device for isolating an analyte of a test liquid, a storing device for storing a laboratory container, an archiving device for archiving a laboratory container, a laboratory container type determination device for determining a laboratory container type, a test liquid quality determination device for determining a test liquid quality, a laboratory container identification device for identifying a laboratory container. Such processing devices of pre-analytical instruments, analytical instruments, post-analytical instruments, and processing devices are well known in the art.

As used herein, the term "coupling element" relates to a mechanical element, which couples, links or connects the first reference point and the second reference point directly or indirectly. As the first reference point and second reference point are coupled, linked or connected to each other, changes of the relative position of the first reference point and the second reference point to each other can easily be detected. In one embodiment, the coupling element comprises two opposite ends and one of the two opposite ends comprises the detectable part. In one embodiment, the first laboratory device and the second laboratory device are coupled to each other only by the coupling element.

In one embodiment, the first reference point comprises a pivot point. The coupling element is pivotable fixed to the pivot point so that the detectable part is movable between the starting position and the at least one detection position. Thus, the detectable part is movable between a starting position and at least one detection position by a rotary motion of the coupling element. In a more specific embodiment, the coupling element is a lever comprising a first recess and a second recess. The pivot point comprises a first pin engaging pivotable with the first recess. The second reference point comprises a second pin engaging movably with the second recess. In one embodiment, the lever is made of a rigid material. For example, the lever may be made of a rigid metal or plastic. In one embodiment, the first recess is a round hole in the coupling element. The second recess is an oblong hole in the coupling element. The round hole and/or the oblong hole may be a depression or a through-hole in the lever. In one embodiment, the lever comprises two opposite ends and one of the two opposite ends comprises the detectable part.

In one embodiment, the distance between the first recess and the second recess is smaller than the distance between the first recess and the detectable part. Accordingly, small motions of the first reference point in a first or second linear moving direction and/or small motions of the second reference point in a third or fourth linear moving direction result in larger motions of the detectable part. Thus, small and/or slow changes of the relative position of the first reference point and the second reference point to each other can be amplified in order to detect them by the sensor.

In another embodiment, the distance between the first recess and the second recess is bigger than the distance between the first recess and the detectable part. Accordingly, large motions of the first reference point in a first or second linear moving direction and/or small motions of the second reference point in a third or fourth linear moving direction result in smaller motions of the detectable part. Thus, large changes of the relative position of the first reference point and the second reference point to each other can be reduced.

In an alternative embodiment, the first reference point and a portion of the coupling element are located between two stopping elements so that the coupling element hits one of the two stopping elements when the relative position of the first reference point and the second reference point to each other changes. The second reference point comprises a support element on which the coupling element is mounted. The coupling element is bendable. Thus, the coupling element bends by hitting against one of the two stopping elements so that the detectable part moves from the starting position towards the at least one detection position. In one embodiment, the stopping elements are cylindrical pins. In another embodiment, the stopping elements are prisms, wherein one lateral edge of each prism is located opposite each other and the reference point is located between the two lateral edges. In one embodiment, the coupling element is made of flexible material. The coupling element may be made of a sheet-like material. Thus, as an example, the sheet-like material may be made of a material having spring properties, such as a plastic material or a metal sheet, such as a spring steel sheet.

As used herein, the term "reference point" relates to a position, place or object of a laboratory device used to determine if the position of the laboratory device or a part thereof relative to another laboratory device or a part thereof changed. The relative position between the laboratory device or a part thereof and the other laboratory device or a part thereof changed if the relative position between the reference point and a reference point of the other laboratory device changed. The first reference point of the first laboratory device is movable in a first linear moving direction and in a second linear moving direction opposite to the first linear moving direction by moving the first laboratory device in the first linear moving direction and in the second linear moving direction opposite to the first linear moving direction. The second reference point of the second laboratory device is movable in a third linear moving direction and in a fourth linear moving direction opposite to the third linear moving direction by moving the second laboratory device in the third linear moving direction and in the fourth linear moving direction opposite to the third linear moving direction. The first, second, third, and fourth moving directions are parallel to each other. The first linear moving direction is opposite to the fourth linear moving direction. The second linear moving direction is opposite of the third linear moving direction. Accordingly, the relative position of the first reference point and the second reference point to each other changes when the first reference point moves in the first linear moving direction or in the second linear moving direction. And/or the relative position of the first reference point and the second reference point to each other may change when the second reference point moves in the third linear moving direction or in the fourth linear moving direction.

As used herein, the term "monitoring" relates to a process to observe and/or to detect changes of the relative position of the first reference point and the second reference point to each other over a period of time. During installation, the first laboratory device and the second laboratory device are positioned to each other so that a secure and reliable interaction between the two laboratory devices is assured, the first reference point and the second reference point are at predefined positions, and the detectable part is in the starting position. If the relative position of the first reference point and the second reference point to each other changes, the detectable part is moving towards the at least one detection position. The distance between the starting position and the detection position relates or correlates to an acceptable or permissible change of the relative position between the first reference point and the second reference point so that the position of the first laboratory device or a part thereof relative to the second laboratory device or a part thereof still allows a secure and reliable interaction between the two laboratory devices. If the detectable part is detected at the at least one detection position by the sensor, the change of the relative position of the first reference point and the second reference point to each other becomes or is inacceptable or impermissible and maintenance action(s) may be initiated as further described below.

In one embodiment, the detectable part is movable between the starting position and a first detection position and between the starting position and a second detection position. The starting position is located between the first detection position and the second detection position. For example, the detectable part moves from the starting position to the first detection position when the second reference point moves in the third linear moving direction and/or the first reference point moves in the second linear moving direction opposite to the third linear moving direction. The detectable part moves from the starting position to the second detection position when the first reference point moves in the first linear moving direction and/or the second reference point moves in the fourth linear moving direction opposite to the first linear moving direction.

In one embodiment, the detectable part comprises a first sub-part and a second sub-part. The sensor is configured to detect the first sub-part when the coupling element is in the first detection position. The sensor is configured to detect the second sub-part when the coupling element is in the second detection position. In a more specific embodiment, the detectable part is a bifurcated end of the coupling element, wherein one end of the bifurcated end comprises the first sub-part and the other end of the bifurcated end comprises the second sub-part. For example, the coupling element is a lever with a U-shaped end comprising the first sub-part and second sub-part.

In one embodiment, the detectable part is also movable between the first detection position and a third detection position. The first detection position is located between the starting position and the third detection position. The laboratory system comprises a further sensor configured to detect the detectable part of the coupling element in the third detection position. For example, the detectable part moves from the first detection position to the third detection position when the second reference point further moves in the third linear moving direction and/or the first reference point further moves in the second linear moving direction opposite to the third linear moving direction. The distance between the starting position and the third detection position relates or correlates to an acceptable or permissible change of the relative position of the first reference point and the second reference point to each other so that the position of the first laboratory device or a part thereof relative to the second laboratory device or a part thereof still allows a secure and reliable interaction between the two laboratory devices. If the detectable part is at the first detection position and detected by the sensor, the change of the relative position of the first reference point and the second reference point to each other is still acceptable or permissible but an alert may be triggered indicating that the detectable part is approaching the third detection position. If the detectable part is at the third detection position and detected by the further sensor, the change of the relative position of the first reference point and the second reference point to each other becomes or is inacceptable or impermissible and maintenance action(s) may be initiated as further described below.

In one embodiment, the detectable part is also movable between the second detection position and a fourth detection position. The second detection position is located between the starting position and the fourth detection position. The laboratory system further comprises a further sensor configured to detect the detectable part in the fourth detection position. For example, the detectable part moves from the second detection position to the fourth detection position when the first reference point further moves in the first linear moving direction and/or the second reference point further moves in the fourth linear moving direction opposite to the first linear moving direction. The distance between the starting position and the fourth detection position relates or correlates to an acceptable or permissible change of the relative position of the first reference point and the second reference point to each other so that the position of the first laboratory device or a part thereof relative to the second laboratory device or a part thereof still allows a secure and reliable interaction between the two laboratory devices. If the detectable part is at the second detection position and detected by the sensor, the change of the relative position of the first reference point and the second reference point to each other is still acceptable or permissible but an alert may be triggered indicating that the detectable part is approaching the fourth detection position. If the detectable part is at the fourth detection position and detected by the further sensor, the change of the relative position of the first reference point and the second reference point to each other becomes or is inacceptable or impermissible and maintenance action(s) may be initiated as further described below.

In one embodiment, the first reference point is located at a first defined distance to a first position of the first laboratory device. The second reference point is located at a second defined distance to a second position of the second laboratory device. The first position may be located on the first laboratory device, in the first laboratory device, or at a defined distance to the first laboratory device. The second position may be located on the second laboratory device, in the second laboratory device, or at a defined distance to the second laboratory device. In one embodiment, the length of the first defined distance and the length of second defined distance are the same or different.

In one embodiment, the first laboratory device and/or the second laboratory device comprises means for adjusting the length of the first defined distance and/or the length of the second defined distance. During installation of the first laboratory device and the second laboratory device, the first reference point and/or the second reference point may be movable to predefined positions so that the detectable part is in the starting position when the first reference point and the second reference point are at predefined positions. For example, the first reference point comprises a first pin and the second reference point comprises a second pin. The first pin and/or the second pin is movably mounted on a guiding element and can be fixed on the guiding element at the predefined positions, e.g., with screws.

When the first position of the first laboratory device and the second position of the second laboratory device are at predefined positions to each other, a secure and reliable interaction between the first laboratory device and the second laboratory device is assured. An interaction between the first laboratory device and the second laboratory device is, as a non-limiting example, a handover or transfer of a laboratory carrier, laboratory container, and/or test liquid between the first laboratory device and the second laboratory device. In one embodiment, the first position of the first laboratory device and the second position of the second laboratory device are movable relative to each other. In a more specific embodiment, the first position of the first laboratory device and the second position of the second laboratory device are movable relative to each other due to a movement between the first laboratory device and the second laboratory device or due environmental factors acting on the first laboratory device and/or on the second laboratory device. A movement between the first laboratory device and the second laboratory device may be caused by a property or a non-uniform movement of the laboratory floor or laboratory wall so that the first laboratory device may sink or shift relative to the second laboratory device. Thus, the relative position between the first reference point and second reference point and the relative position of the first position and the second position may change due to non-uniform movements of the laboratory floor on which the first laboratory device and the second laboratory device are installed or due to non-uniform movements of the laboratory wall to which the first laboratory device and the second laboratory device are attached. A movement between the first laboratory device and the second laboratory device may also be caused by forces acting on the first laboratory device and/or second laboratory device. For example, a user may accidentally hit the first and/or second laboratory device. Furthermore, environmental factors such as temperature or humidity may cause a laboratory device or a part thereof to expand or tighten thereby changing the relative position of the first position and the second position to each other. The distance between the starting position and the at least one detection position correlates to an acceptable or permissible change of the relative position of the first position of the first laboratory device and the second position of the second laboratory device to each other so that a secure and reliable interaction such as for example a transfer of a laboratory carrier between the first laboratory device and second laboratory device is still assured. If the detectable part is detected at the at least one detection position by the sensor, the change of the relative position of the first position and the second position to each other becomes or is inacceptable or impermissible and maintenance action(s) may be initiated as further described below.

In one embodiment, the first position of the first laboratory device is comprised by a first plane and the second position of the second laboratory device is comprised by a second plane. The first plane and the second plane are parallel to each other. In a more specific embodiment, the first plane and the second plane are substantially coplanar when the detectable part is in the starting position or the first plane and the second plane are located at a predefined distance to each other when the detectable part is in the starting position. In one embodiment, the first plane and the second plane are horizontally oriented or vertically oriented.

In a more specific embodiment, the first plane comprises a first planar transportation surface of the first laboratory device adapted to transport a laboratory container or laboratory carrier. The second plane comprises a second planar transportation surface of the second laboratory device adapted to transport the laboratory container or the laboratory carrier. The first planar transportation surface and the second planar transportation surface are adjacent to other. For a secure and reliable handover or transfer of a laboratory container or laboratory carrier between the first planar transportation surface and the second planar transportation surface, the first plane and the second plane have to be substantially coplanar. If the detectable part is detected at the at least one detection position by the sensor, the offset between the first plane and the second plane is too large to assure a secure and reliable transfer of the laboratory container or laboratory carrier any longer and maintenance action(s) may be initiated as further described below.

In one embodiment, the first plane comprises a level at which a laboratory container located on the first laboratory device has to be gripped. The second plane comprises a gripping level of a gripper of the second laboratory device. In one embodiment, the first plane which comprises the level at which a laboratory container located on the first laboratory device has to be gripped is parallel at a defined distance to a planar transportation surface of the first laboratory device. For a secure and reliable handover or transfer of the laboratory container between the planar transportation surface of the first laboratory device and the gripper of the second laboratory device, the first plane and the second have to be substantially coplanar. If the detectable part is detected at the at least one detection position by the sensor, the offset between the first plane and the second plane is too large to assure a secure and reliable transfer of the laboratory container and maintenance action(s) may be initiated as further described below.

In one embodiment, the first plane comprises a level at which a test liquid in a laboratory container located on the first laboratory device has to be aspirated or dispensed. The second plane comprises an aspiration or dispensation level of a pipettor of the second laboratory device. In one embodiment, the first plane which comprises the level at which a test liquid in a laboratory container located on the first laboratory device has to be aspirated or dispensed is parallel at a defined distance to a planar transportation surface of the first laboratory device. For a secure and reliable handover or transfer of the test liquid between the laboratory container located on the first laboratory device and the pipettor of the second laboratory device, the first plane and the second have to be substantially coplanar. If the detectable part is detected at the at least one detection position by the sensor, the offset between the first plane and the second plane is too large to assure a secure and reliable transfer of the test liquid and maintenance action(s) may be initiated as further described below.

In one embodiment, the first laboratory device and the second laboratory device are of the same or different type of laboratory devices. In one embodiment, the type of the first laboratory device is a transportation device, a pre-analytical instrument, analytical instrument, or post-analytical instrument. The type of the second laboratory device is a transportation device, a pre-analytical instrument, analytical instrument, or post-analytical instrument. In one embodiment, the first laboratory device is adjacent to the second laboratory device. In one embodiment, multiple adjacent transportation devices may form a transport system for transporting or distributing laboratory containers to operatively coupled pre-analytical instruments, analytical instruments, or post-analytical instruments. In another embodiment, a transportation device may be located in front of a pre-analytical instrument, analytical instrument, or post-analytical instrument comprising a gripper for gripping a laboratory container from the transportation device. In another embodiment, the pre-analytical instrument, analytical instrument, or post-analytical instrument comprises a transportation device for receiving a laboratory container or laboratory carrier from a transportation device located in front of the instrument or for transporting the laboratory container or laboratory carrier within the instrument.

In one embodiment, the sensor is a light barrier, a pressure sensor, a camera, an inductive sensor, or a conductive sensor. For example, the sensor is a light barrier adapted to detect an interruption of a light beam caused by the detectable part of the coupling element. The interruption of a light beam generates a signal that is transmitted to a control unit communicatively connected to the sensor.

In one embodiment, the first laboratory device and/or the second laboratory device comprises means for manually or automated adjusting the first plane and the second plane to each other. In a specific embodiment, the means for adjusting are adjustable feet of the laboratory device. For example, each of the adjustable feet comprises two parts that can be moved relative to each other for extending or retracting the feet. The feet may further comprise an actuator, e.g., an electric motor, for extending or retracting the feet in order to adjust the first plane and the second plane to each other. Alternatively, the two parts may be moved manually for manual adjustment of the first plane and second plane to each other. In another specific embodiment, the means for adjusting is a robotic arm on which a gripper is mounted. The robotic arm is constructed to move the gripper in the three-dimensional directions and to position the gripper at a gripping level. If the first plane comprises a level at which a laboratory container located on the first laboratory device has to be gripped, the second plane comprises a gripping level of the gripper of the second laboratory device, and the offset between the first plane and the second plane is too large for secure and reliable transfer of the laboratory carrier, the movements of the robotic can be reconfigured or readjusted based on the offset.

In one embodiment, the laboratory system further comprises a control unit communicatively connected to the sensor. The control unit is configured to trigger a maintenance action when the sensor detects the detectable part in the at least one detection position. In one embodiment, the maintenance action comprises one or more of the following actions: the control unit displays on a display a user notification prompting a user to adjust the first plane and the second plane to each other; the control unit is further communicatively connected to the first laboratory device and/or second laboratory device and turns off the first laboratory device and/or the second laboratory device; the control unit is further communicatively connected to a means for automated adjusting and controls the means for automated adjusting to adjust the first plane and the second plane to each other.

The term "control unit" as used herein encompasses any physical or virtual processing device comprising a processor that is configured to control the laboratory system. The processor of the control unit may, for instance, be embodied as a programmable logic controller adapted to execute a computer-readable program provided with instructions to perform operations of the laboratory system. In one embodiment, the control unit comprises a display on which a user notification prompting a user to adjust the first plane and the second plane to each other can be displayed. The user notification may further comprise instructions on how to adjust the first plane and the second plane to each other. For example, the user may receive information about which adjustable feet of which laboratory device have to extended or retracted. Thus, one operation of the control unit is to display this user notification when the sensor detects the detectable part of the coupling element. In one embodiment, the control unit is further communicatively connected to the first laboratory device and/or second laboratory device and another operation of the control unit is to turn off the first laboratory device and/or the second laboratory device when the sensor detects the detectable part of the coupling element. Accordingly, an unsecure or unreliable interaction between the first laboratory device and second laboratory device can be prevented. In one embodiment, the control unit is further communicatively connected to a means for automated adjusting and another operation of the control unit is to control the means for automated adjusting to adjust the first plane and the second plane to each other when the sensor detects the detectable part of the coupling element. For example, the control unit controls one or more actuators for adjusting (extending or retracting) one or more adjustable feet of a laboratory device. Or the control unit reconfigures or readjusts the movements of an robotic arm.

The present disclosure also relates to a method of operating a laboratory system as described herein. The method comprises the following steps: a) detecting, by the sensor, the detectable part of the coupling element in the at least one detection position; and b) triggering, by the control unit, a maintenance action.

In order that the embodiments of the present disclosure may be more readily understood, reference is made to the following examples, which are intended to illustrate the disclosure, but not limit the scope thereof.

FIGS. 1A-1D show a schematic side view of an embodiment of a laboratory system (10) to monitor reference points (12, 14) of laboratory devices (16, 18). The laboratory system (10) comprises a first laboratory device (16) comprising a first reference point (12) and a second laboratory device (18) comprising a second reference point (14). The laboratory system (10) further comprises a coupling element (20) that couples the first reference point (12) and the second reference point (14). The coupling element (20) comprises a detectable part (22) adapted to be moved between a starting position (24) and at least one detection position (26, 40) when the relative position of the first reference point (12) and the second reference point (14) to each other changes. The laboratory system (10) further comprises a sensor (28) configured to detect the detectable part (22) of the coupling element (20) in the at least one detection position (26, 40).

In the shown embodiment, the first reference point (12) comprises a pivot point and the coupling element (20) is pivotable fixed to the pivot point so that the detectable part (22) is movable between the starting position (24) and the at least one detection position (26, 40). The depicted coupling element (20) is a lever made of a rigid material. The lever comprises a first recess (30) and a second recess (32). The pivot point comprises a first pin (34) engaging pivotable with the first recess (30) and the second reference point (14) comprises a second pin (36) engaging movably with the second recess (32). The first recess (30) is a round hole in the coupling element (20) and the second recess (32) is an oblong hole in the coupling element (20). As shown in FIGS. 1A and 1B, the detectable part (22) is movable between the starting position (24) and a first detection position (26). The detectable part (22) is also movable between the starting position (24) and a second detection position (40) as shown in FIG. 10. The detectable part (22) comprises a first sub-part (21) and a second sub-part (23). The sensor (28) is configured to detect the first sub-part (21) when the coupling element (20) is in the first detection position (26) as shown in FIG. 1B. And the sensor (28) is configured to detect the second sub-part (23) when the coupling element (20) is in the second detection position (40) as shown in FIG. 10. As further shown in FIG. 1A, the first reference point (12) is located at a first defined distance to a first position (50) of the first laboratory device (16) as indicated by a first vertical dotted line. The second reference point (14) is located at a second defined distance to a second position (52) of the second laboratory device (18) as indicated by a second vertical dotted line in FIG. 1A. In the shown embodiment, the length of the first defined distance and the length of second defined distance are the same. The first position (50) of the first laboratory device (16) and the second position (52) of the second laboratory device (18) are movable relative to each other as shown in FIGS. 1A to 1D. For example, a movement between the first laboratory device (16) and the second laboratory device (18) may be caused by a non-uniform movement of the laboratory floor (53) so that the second laboratory device (18) sinks relative to the first laboratory device (16) as shown in FIG. 1B. Or a movement between the first laboratory device (16) and the second laboratory device (18) may be caused by a non-uniform movement of the laboratory floor (53) so that the first laboratory device (16) sinks relative to the second laboratory device (18) as shown in FIG. 10. Thus, the relative position between the first reference point (12) and second reference point (14) and the relative position between the first position (50) and the second position (52) may change due to non-uniform movements of the laboratory floor (53) on which the first laboratory device (16) and the second laboratory device (18) are installed.

As further shown in FIGS. 1A to 1D, the first position (50) of the first laboratory device (16) is comprised by a first plane (54), and the second position (52) of the second laboratory device (18) is comprised by a second plane (56). The first plane (54) and the second plane (56) are parallel to each other. In FIG. 1A, the first plane (54) and the second plane (56) are coplanar and the detectable part (22) is in the starting position (24). In the shown embodiment, the first laboratory device (16) and the second laboratory device (18) are transportation devices each comprising a planar transportation surface (55, 57). The first plane (54) comprises the first planar transportation surface (55) of the first laboratory device (16) adapted to transport a laboratory carrier (58) as is indicated by a dotted arrow in FIG. 1A. The shown laboratory carrier (58) on the first planar transportation surface (55) is loaded with a laboratory container (61). The second plane (56) comprises a second planar transportation surface (57) of the second laboratory device (18) adapted to transport a laboratory carrier (58) as indicated by a dotted arrow in FIG. 1A. The first planar transportation surface (55) and the second planar transportation surface (57) are adjacent to other so that laboratory carriers (58) can be transported or transferred between the first planar transportation surface (55) and the second planar transportation surface (57). In FIG. 1B, the first plane (54) and the second plane (56) have an offset due to a non-uniform movement of the laboratory floor (53) and the detectable part (22) is in the first detection position (26). Also in FIG. 10, the first plane (54) and the second plane (56) are not coplanar anymore but the detectable part (22) is in the second detection position (40).

In the shown embodiment, the first laboratory device (16) and the second laboratory device (18) comprise means (59) such as adjustable feet for automated adjusting the first plane (54) and the second plane (56) to each other so that the first plane (54) and the second plane (56) are coplanar again, and laboratory carriers (58) can securely and reliably be transported between the first and second planar transportation surfaces (55, 57) as indicated by dotted arrows in FIG. 1D. In the shown embodiment, the laboratory system (10) further comprises a control unit (62) communicatively connected to the sensor (28) as indicated by a dashed line and to the means (59) for automated adjusting. The control unit (62) is configured to control the means (59) for automated adjusting to adjust the first plane (54) and the second plane (56) to each other when the sensor (28) detects the detectable part (22) in the at least one detection position (26, 40). Additionally or alternatively, the control unit (62) is further communicatively connected to the first laboratory device (16) and/or second laboratory device (18) and turns off the first laboratory device (16) and/or the second laboratory device (18) when the sensor (28) detects the detectable part (22) in the at least one detection position (26, 40). Accordingly, an unsecure or unreliable transfer or transport of laboratory carriers (58) between the first laboratory device (16) and second laboratory device (18) can be prevented. Alternatively, the first laboratory device (16) and the second laboratory device (18) may comprise means (59) such as adjustable feet for manually adjusting the first plane (54) and the second plane (56) to each other. And the control unit (62) is configured to display on a display (64) a user notification prompting a user to adjust the first plane (54) and the second plane (56) to each other when the sensor (28) detects the detectable part (22) in the at least one detection position (26, 40).

FIGS. 2A-2B show another schematic side view of an embodiment of a laboratory system (10) to monitor reference points (12, 14) of laboratory devices (16, 18). The laboratory system (10) comprises a first laboratory device (16) comprising a first reference point (12) and a second laboratory device (18) comprising a second reference point (14). The laboratory system (10) further comprises a coupling element (20) which couples the first reference point (12) and the second reference point (14). The coupling element (20) comprises a detectable part (22) adapted to be moved between a starting position (24) and at least one detection position (26) when the relative position of the first reference point (12) and the second reference point (14) to each other changes. The laboratory system (10) further comprises a sensor (28) configured to detect the detectable part (22) of the coupling element (20) in the at least one detection position (26).

In the shown embodiment, the coupling element (20) is bendable. The first reference point (12) and a portion of the coupling element (20) are located between two stopping elements (38) in form of two cylindrical pins so that the coupling element (20) hits one of the two stopping elements (38) when the relative position of the first reference point (12) and the second reference point (14) to each other changes as shown in FIG. 2B. The second reference point (14) comprises a support element (39) on which the coupling element (20) is mounted. Thus, the coupling element (20) bends by hitting against one of the two stopping elements (38) so that the detectable part (22) moves from the starting position (24) towards the at least one detection position (26)

as shown in FIG. 2B. The detectable part (22) may also be movable between the starting position (24) and a second detection position (40, not shown in FIG. 2). As further shown, the detectable part (22) comprises a first sub-part (21) and a second sub-part (23). The sensor (28) is configured to detect the first sub-part (21) when the coupling element (20) is in the first detection position (26) as shown in FIG. 1B. The sensor (28) may also be configured to detect the second sub-part (23) when the coupling element (20) is in a second detection position (40, not shown in FIG. 2). As further shown in FIG. 2A, the first reference point (12) is located at a first defined distance to a first position (50) of the first laboratory device (16) as indicated by a first vertical dotted line. And the second reference point (14) is located at a second defined distance to a second position (52) of the second laboratory device (18) as indicated by a second vertical dotted line in FIG. 2A. In the shown embodiment, the length of the first defined distance and the length of second defined distance are the same. The first position (50) of the first laboratory device (16) and the second position (52) of the second laboratory device (18) are movable relative to each other as shown in FIGS. 2A to 2B. For example, a movement between the first laboratory device (16) and the second laboratory device (18) may be caused by a non-uniform movement of the laboratory floor (53) so that the second laboratory device (18) sinks relative to the first laboratory device (16) as shown in FIG. 2B. Thus, the relative position between the first reference point (12) and second reference point (14) and the relative position between the first position (50) and the second position (52) may change due to movements of the laboratory floor (53) on which the first laboratory device (16) and the second laboratory device (18) are installed. As further shown in FIGS. 2A and 2B, the first position (50) of the first laboratory device (16) is comprised by a first plane (54), and the second position (52) of the second laboratory device (18) is comprised by a second plane (56). The first plane (54) and the second plane (56) are parallel to each other. In FIG. 2A, the first plane (54) and the second plane (56) are coplanar and the detectable part (22) is in the starting position (24). In the shown embodiment, the first laboratory device (16) and the second laboratory device (18) are transportation devices each comprising a planar transportation surface (55, 57). The first plane (54) comprises a first planar transportation surface (55) of the first laboratory device (16) adapted to transport a laboratory carrier (58, not shown in FIG. 2). The second plane (56) comprises a second planar transportation surface (57) of the second laboratory device (18) adapted to transport a laboratory carrier (58, not shown in FIG. 2). The first planar transportation surface (55) and the second planar transportation surface (57) are adjacent to other so that laboratory carriers (58) can be transported or transferred between the first planar transportation surface (55) and the second planar transportation surface (57). In FIG. 2B, the first plane (54) and the second plane (56) have an offset due to a non-uniform movement of the laboratory floor (53) and the detectable part (22) is in the first detection position (26).

In the shown embodiment, the first laboratory device (16) and the second laboratory device (18) comprise means (59) such as adjustable feet for automated adjusting the first plane (54) and the second plane (56) to each other. The laboratory system (10) may further comprises a control unit (62) communicatively connected to the sensor (28) as indicated by a dashed line and to the means (59) for automated adjusting. The control unit (62) is configured to control the means (59) for automated adjusting to adjust the first plane (54) and the second plane (56) to each other when the sensor (28) detects the detectable part (22) in the at least one detection position (26). Additionally or alternatively, the control unit (62) is further communicatively connected to the first laboratory device (16) and/or second laboratory device (18) and turns off the first laboratory device (16) and/or the second laboratory device (18) when the sensor (28) detects the detectable part (22) in the at least one detection position (26). Accordingly, an unsecure or unreliable transfer or transport of laboratory carriers (58) between the first laboratory device (16) and second laboratory device (18) can be prevented. Alternatively, the first laboratory device (16) and the second laboratory device (18) may comprise means (59) such as adjustable feet for manually adjusting the first plane (54) and the second plane (56) to each other. And the control unit (62) is configured to display on a display (64) a user notification prompting a user to adjust the first plane (54) and the second plane (56) to each other when the sensor (28) detects the detectable part (22) in the at least one detection position (26, 40).

FIG. 3 shows a schematic side view of another embodiment of a laboratory system (10) to monitor reference points (12, 14) of laboratory devices. The laboratory system (10) comprises a first laboratory device (16) comprising a first reference point (12), a second laboratory device (18) comprising a second reference point (14), a coupling element (20) that couples the first reference point (12) and the second reference point (14), a sensor (28), and a control unit (62) communicatively connected to the sensor (28) as shown in FIG. 1. As further shown in FIG. 3, the first reference point (12) is located at a first defined distance to a first position (50) of the first laboratory device (16) as indicated by a first vertical dotted line in FIG. 3. The first position (50) is located at a defined distance to the first laboratory device (16). The second reference point (14) is located at a second defined distance to a second position (52) of the second laboratory device (18) as indicated by a second vertical dotted line in FIG. 3. The second position (52) is located at a defined distance to the second laboratory device (16). In the shown embodiment, the length of the first defined distance and the length of second defined distance are the same. Also the distance between the first position (50) and the first laboratory device (16) and the distance between the second position (52) and second laboratory device (18) are the same. The first position (50) of the first laboratory device (16) and the second position (52) of the second laboratory device (18) are movable relative to each other. For example, a movement between the first laboratory device (16) and the second laboratory device (18) may be caused by a non-uniform movement of the laboratory floor (53) so that the second laboratory device (18) sinks relative to the first laboratory device (16). Thus, the relative position between the first reference point (12) and second reference point (14) and the relative position between the first position (50) and the second position (52) may change due to non-uniform movements of the laboratory floor (53) on which the first laboratory device (16) and the second laboratory device (18) are installed. However, FIG. 3 depicts only a status of the laboratory system (10) right after installation of the first laboratory device (16) and second laboratory device (18). As further shown in FIG. 3, the first position (50) of the first laboratory device (16) is comprised by a first plane (54) and the second position (52) of the second laboratory device (18) is comprised by a second plane (56). The first plane (54) and the second plane (56) are coplanar and the detectable part (22) is in the starting position (24). In the shown embodiment, the first laboratory device (16) is a transportation device comprising a planar transportation surface (55). The second laboratory device (18) is a pre-analytical instrument, analytical instrument, or post-analytical instrument comprising a gripper (60) mounted on a robotic arm (63). The first plane (54) comprises a level at which a laboratory container (61) located on the planar transportation surface (55) of the first laboratory device (16) has to be gripped. The second plane (56) comprises a gripping level of the gripper (60) of the second laboratory device (18). The shown first plane (54), which comprises the level at which the laboratory container (61) located on the first laboratory device (16) has to be gripped, is parallel at a defined distance to the planar transportation surface (55) of the first laboratory device (16). For a secure and reliable handover or transfer of the laboratory container (61) between the first laboratory device (16) and the gripper (60) of the second laboratory device (18), the first plane (54) and the second plane (56) have to be substantially coplanar. If the offset between the first plane (54) and the second plane (56) is too large, the movements of the robotic arm (63) can be reconfigured or readjusted based on the offset.

Figure 4:
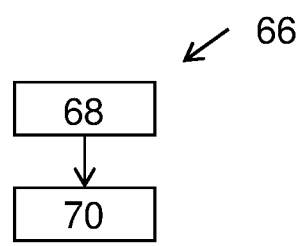
FIG. 4 shows a flowchart of an embodiment of a method of operating an embodiment of a laboratory system to monitor reference points of laboratory devices in accordance with the present disclosure.

FIG. 4 shows a flowchart of an embodiment of a method (66) of operating an embodiment of a laboratory system (10) to monitor reference points (12, 14) of laboratory devices (16, 18) as described in FIG. 1 to FIG. 3. In a first step a) (68) of the method (66), the sensor (28) detects the detectable part (22) of the coupling element (20) in the at least one detection position (26, 40). Subsequently, the control unit (52) triggers a maintenance action in step b) (70) of the method (66). The maintenance action comprises one or more of the following actions: The control unit may (62) display on a display (64) a user notification prompting a user to adjust the first plane (54) and the second plane (56) to each other. And/or the control unit (62) is further communicatively connected to the first laboratory device (16) and/or second laboratory device (18) and turns off the first laboratory device (16) and/or the second laboratory device (18). And/or the control unit (62) is further communicatively connected to the means (59) for automated adjusting and controls the means (59) for automated adjusting to adjust the first plane (54) and the second plane (56) to each other.

In the preceding description and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore understood that within the scope of the appended claims, the disclosure may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this description are not necessarily all referring to the same embodiment or example.

LIST OF REFERENCE NUMBERS 10 laboratory system
12 first reference point
14 second reference point
16 first laboratory device
18 second laboratory device
20 coupling element
21 first sub-part
22 detectable part
23 second sub-part
24 starting position
26 first detection position
28 sensor
30 first recess
32 second recess
34 first pin
36 second pin
38 stopping element
39 support element
40 second detection position
50 first position of the first laboratory device
52 second position of the second laboratory device
53 laboratory floor
54 first plane
55 first planar transportation surface
56 second plane
57 second planar transportation surface
58 laboratory carrier
59 means for manually or automated adjusting the first plane and the second plane
60 gripper
61 laboratory container
62 control unit
63 robotic arm
64 display
66 method
68 step a) of the method
70 step b) of the method

What is claimed is:

1. A laboratory system to monitor reference points of laboratory devices, wherein the laboratory system comprises:

a first laboratory device comprising a first reference point;
a second laboratory device comprising a second reference point;
a coupling element wherein the coupling element couples the first reference point and the second reference point, wherein the coupling element comprises a detectable part adapted to be moved between a starting position and at least one detection position when the relative position of the first reference point and the second reference point to each other changes, wherein the first reference point comprises a pivot point, wherein the coupling element is pivotably fixed to the pivot point so that the detectable part is movable between the starting position and the at least one detection position; and
a sensor configured to detect the detectable part of the coupling element in the at least one detection position, wherein the coupling element is a lever comprising a first recess and a second recess, wherein the pivot point comprises a first pin engaging pivotably with the first recess, wherein the second reference point comprises a second pin engaging movably with the second recess.

2. The laboratory system to monitor reference points of laboratory devices according to claim 1, wherein the distance between the first recess and the second recess is smaller than the distance between the first recess and the detectable part.

3. The laboratory system to monitor reference points of laboratory devices according to claim 1, wherein the detectable part is movable between the starting position and a first detection position and between the starting position and a second detection position, wherein the starting position is located between the first detection position and the second detection position.

4. The laboratory system to monitor reference points of laboratory devices according to claim 3, wherein the detectable part comprises a first sub-part and a second sub-part, wherein the sensor is configured to detect the first sub-part when the coupling element is in the first detection position, wherein the sensor is configured to detect the second sub-part when the coupling element is in the second detection position.

5. The laboratory system to monitor reference points of laboratory devices according to claim 1, wherein the first reference point is located at a first defined distance to a first position of the first laboratory device, wherein the second reference point is located at a second defined distance to a second position of the second laboratory device.

6. The laboratory system to monitor reference points of laboratory devices according to claim 5, wherein the first position of the first laboratory device and the second position of the second laboratory device are movable relative to each other.

7. The laboratory system to monitor reference points of laboratory devices according to claim 5, wherein the first position of the first laboratory device is comprised by a first plane and the second position of the second laboratory device is comprised by a second plane, wherein the first plane and the second plane are parallel to each other.

8. The laboratory system to monitor reference points of laboratory devices according to claim 7, wherein the first plane and the second plane are substantially coplanar when the detectable part is in the starting position or the first plane and the second plane are located at a predefined distance to each other when the detectable part is in the starting position.

9. The laboratory system to monitor reference points of laboratory devices according to claim 7, wherein the first plane comprises a first planar transportation surface of the first laboratory device adapted to transport a laboratory container or a laboratory carrier and the second plane comprises a second planar transportation surface of the second laboratory device adapted to transport the laboratory container or the laboratory carrier, wherein the first planar transportation surface and the second planar transportation surface are adjacent to other.

10. The laboratory system to monitor reference points of laboratory devices according to claim 7, wherein the first plane comprises a level at which a laboratory container located on the first laboratory device is desired to be gripped by a user, wherein the second plane comprises a gripping level of a gripper of the second laboratory device.

11. The laboratory system to monitor reference points of laboratory devices according to claim 1, wherein the laboratory system further comprises a control unit communicatively connected to the sensor, wherein the control unit is configured to trigger a maintenance action when the sensor detects the detectable part in the at least one detection position.

12. A method of operating a laboratory system according to claim 11, comprising the following steps:
 a) detecting, by the sensor, the detectable part of the coupling element in the at least one detection position; and
 b) triggering, by the control unit, the maintenance action.

13. A laboratory system to monitor reference points of laboratory devices, wherein the laboratory system comprises:
 a first laboratory device comprising a first reference point;
 a second laboratory device comprising a second reference point;
 a coupling element wherein the coupling element couples the first reference point and the second reference point, wherein the coupling element comprises a detectable part adapted to be moved between a starting position and at least one detection position when the relative position of the first reference point and the second reference point to each other changes; and
 a sensor configured to detect the detectable part of the coupling element in the at least one detection position,
 wherein the first reference point and a portion of the coupling element are located between two stopping elements so that the coupling element hits one of the two stopping elements when the relative position of the first reference point and the second reference point to each other changes, wherein the second reference point comprises a support element on which the coupling element is mounted, wherein the coupling element is bendable.

* * * * *